(12) United States Patent
Mayes

(10) Patent No.: US 6,989,668 B2
(45) Date of Patent: Jan. 24, 2006

(54) ROTOR POSITION DETECTION OF A SWITCHED RELUCTANCE DRIVE

(75) Inventor: Peter Richard Mayes, Bradford (GB)

(73) Assignee: Switched Reluctance Drives Limited, Harrogate (GB)

( * ) Notice: Subject to any disclaimer, the term of this patent is extended or adjusted under 35 U.S.C. 154(b) by 57 days.

(21) Appl. No.: 10/861,619

(22) Filed: Jun. 4, 2004

(65) Prior Publication Data

US 2004/0245983 A1    Dec. 9, 2004

(30) Foreign Application Priority Data

Jun. 4, 2003   (GB)   .................................... 0312848

(51) Int. Cl.
*G01B 7/30*  (2006.01)
*H02P 1/18*  (2006.01)

(52) U.S. Cl. ...................... 324/207.16; 324/207.25; 318/254; 318/701

(58) Field of Classification Search ........... 324/207.15, 324/207.16, 207.17, 207.18, 207.25, 173, 324/174, 160, 166, 177; 318/254, 701, 720–721
See application file for complete search history.

(56) References Cited

U.S. PATENT DOCUMENTS

| | | | |
|---|---|---|---|
| 4,772,839 A * | 9/1988 | MacMinn et al. ........... | 318/696 |
| 5,373,206 A * | 12/1994 | Lim ........................... | 310/68 B |
| 5,469,039 A | 11/1995 | Stephenson et al. | |
| 6,288,513 B1 * | 9/2001 | Green ........................ | 318/700 |
| 6,396,237 B2 * | 5/2002 | Mayes ....................... | 318/701 |
| 6,853,163 B2 * | 2/2005 | Slater ........................ | 318/700 |

FOREIGN PATENT DOCUMENTS

| | | |
|---|---|---|
| EP | 0 573 198 A1 | 12/1993 |
| WO | WO 91/02401 | 2/1991 |

OTHER PUBLICATIONS

Mvungi, N.M., et al., "Accurate Sensorless Rotor Position Detection in an SR Motor," EPE Firenze, vol. 1, 1991, pp. 390-393.

Ray, W.F., et al., "Sensorless Methods for Determining the Rotor Position of Switched Reluctance Motors," EPE Brighton, 1993, vol. 6, pp. 7-13.

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

* cited by examiner

*Primary Examiner*—Jay Patidar
(74) *Attorney, Agent, or Firm*—Dicke, Billig & Czaja, PLLC

(57) ABSTRACT

A switched reluctance drive is controlled without using a physical rotor position detector. The control method estimates the standing flux-linkage associated with the phase and uses this estimate to improve its subsequent estimate of rotor position. The method works robustly regardless of whether the current is continuous or is discontinuous.

22 Claims, 6 Drawing Sheets

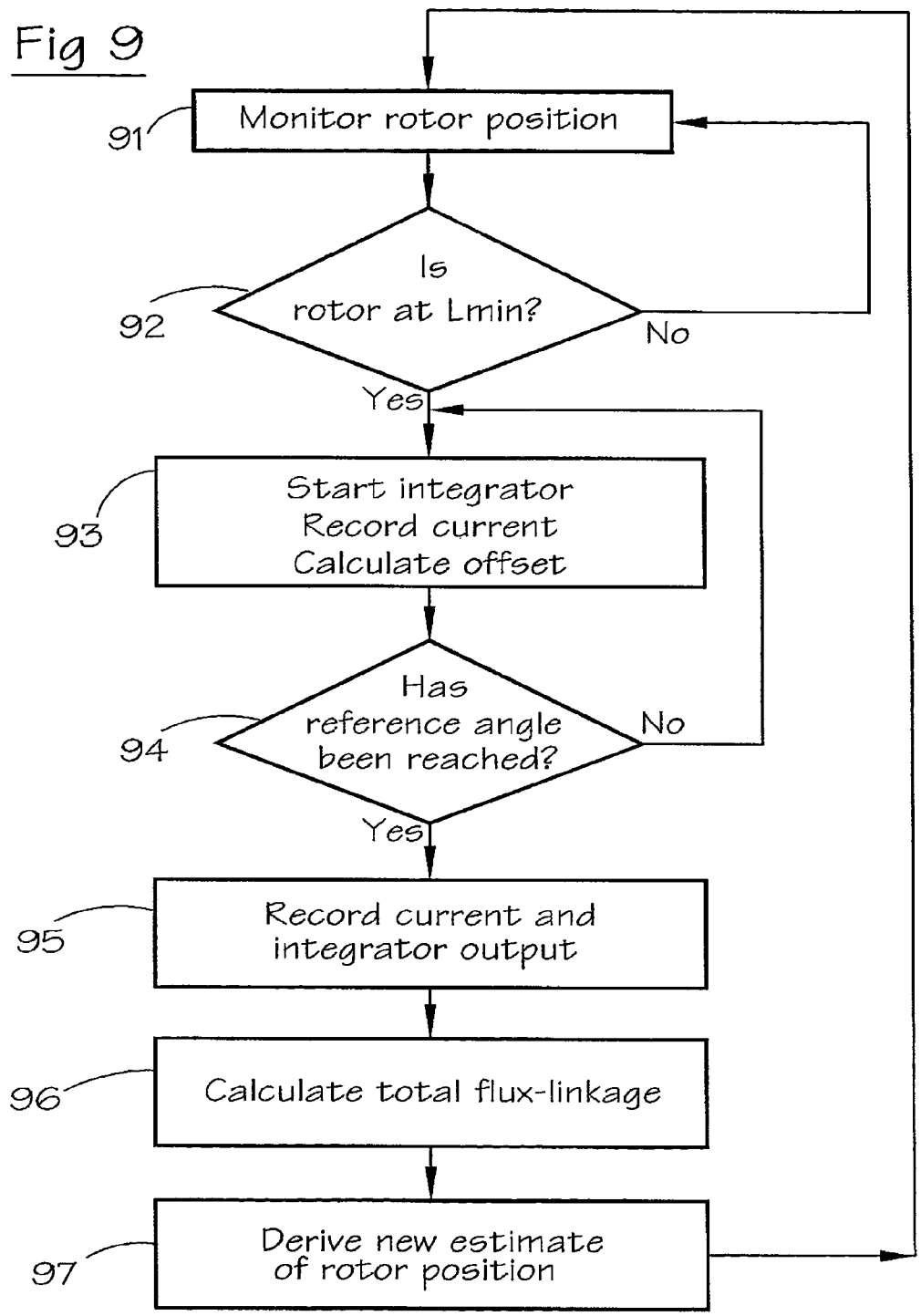

ROTOR POSITION DETECTION OF A SWITCHED RELUCTANCE DRIVE

CROSS-REFERENCE TO RELATED APPLICATION

The subject matter of this application is related to the subject matter of British Patent Application No. GB 0312848.5, filed Jun. 4, 2003, priority to which is claimed under 35 U.S.C. § 119 and which is incorporated herein by reference.

BACKGROUND OF THE INVENTION

1. Field of the Invention

This invention relates to sensorless rotor position monitoring in reluctance machines, particularly in switched reluctance machines.

2. Description of Related Art

The control and operation of switched reluctance machines generally are described in the paper "The Characteristics, Design and Applications of Switched Reluctance Motors and Drives" by J. M. Stephenson and R. J. Blake, which is incorporated herein by reference, delivered at the PCIM'93 Conference and Exhibition held in Nürnberg, Germany, 21–24 Jun. 1993. In that paper the "chopping" and "single-pulse" modes of energization of switched reluctance machines are described for operation of the machine at low and high speeds, respectively.

A typical prior art drive is shown schematically in FIG. 1. This includes a DC power supply 11 that can be either a battery or rectified and filtered AC mains. The DC voltage provided by the power supply 11 is switched across phase windings 16 of the motor 12, connected to a load 19, by a power converter 13 under the control of the electronic control unit 14. One of the many known converter topologies is shown in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current"), which cannot be drawn from or returned to the supply. In practical terms, the capacitor 25 may comprise several capacitors connected in series and/or parallel and, where parallel connection is used, some of the elements may be distributed throughout the converter. A resistor 28 is connected in series with the lower switch 22 to provide a current feedback signal. A multiphase system typically uses several "phase legs" of FIG. 2 connected in parallel to energize the phases of the electrical machine.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical, magnetic or other sensor mounted on the stator. A signal, e.g. a pulse train, indicative of rotor position relative to the stator is generated by the sensor and supplied to control circuitry, allowing accurate phase energization. This system is simple and works well in many applications. However, the rotor position transducer increases the overall cost of assembly, adds extra electrical connections to the machine and is, therefore, a potential source of unreliability.

Various methods for dispensing with the rotor position transducer have been proposed. Several of these are reviewed in "Sensorless Methods for Determining the Rotor Position of Switched Reluctance Motors" by W F Ray and I H Al-Bahadly, published in the Proceedings of The European Power Electronics Conference, Brighton, UK, 13–16 Sep. 1993, Vol. 6, pp 7–13, incorporated herein by reference.

Many of these methods proposed for rotor position estimation use the measurement of phase flux-linkage (i.e. the integral of applied voltage with respect to time) and current in one or more phases. Position is calculated using knowledge of the variation in inductance of the machine as a function of angle and current. This characteristic can be stored as a flux-linkage/angle/current table and is depicted graphically in FIG. 3. The storage of this data is a disadvantage as it involves the use of a large memory array and/or additional system overheads for interpolation of data between stored points.

Some methods make use of this data at low speeds where "chopping" current control is the dominant control strategy for varying the developed torque. Chopping control is illustrated graphically in FIG. 4($a$) in which the current and inductance waveforms are shown over a phase inductance period. (Note that the variation of inductance is depicted in idealized form.) These methods usually employ diagnostic pulses in non-torque-productive phases. A method suited to low-speed operation is that proposed by N. M. Mvungi and J. M. Stephenson in "Accurate Sensorless Rotor Position Detection in an S R Motor", published in Proceedings of the European Power Electronics Conference, Firenze, Italy, 1991, Vol. 1, pp 390–393, incorporated herein by reference.

Other methods operate in the "single-pulse" mode of energization at higher speeds. This mode is illustrated in FIG. 4($b$) in which the current and inductance waveforms are shown over a phase inductance period. These methods monitor the operating voltages and currents of an active phase without interfering with normal operation. A typical higher speed method is described in International Patent Application WO 91/02401, incorporated herein by reference.

Having to store a two-dimensional array of machine data in order to operate without a position sensor is an obvious disadvantage. Alternative methods have been proposed, which avoid the need for the majority of angularly referenced information and instead store data at one angle only. One such method is described in European Patent Application EP-A-0573198 (Ray), incorporated herein by reference. This method aims to sense the phase flux-linkage and current at a predefined angle by adjusting the diagnostic point in accordance with the calculated deviation away from the desired point. Flux-linkage is estimated by integrating (with respect to time) the measurement of the voltage applied to the phase. Two one-dimensional tables are stored in the preferred embodiment, one of flux-linkage versus current at a referenced rotor angle and another of the differential of flux-linkage with respect to rotor angle versus current. By monitoring phase voltage and current, the deviation away from a predicted reference angle can be assessed, with the aid of the look-up tables, and system operation can be adjusted accordingly. This method has been shown to be reliable, provided that the flux-linkage can be determined with sufficient accuracy whenever required by the position-detecting algorithm. To avoid the flux-linkage integrator drifting (due to unwanted noise in the system and imperfections in the integrator) it is set to zero at the end of each conduction cycle, when the current has fallen to zero and the phase winding is no longer linking any flux. This method is a "predictor/corrector" method, in that it initially predicts when the rotor will be at a reference position, measures parameters of the machine when it believes the reference position has been reached, and uses the results of these measurements to detect error in the prediction and hence take corrective action by adopting a new prediction for the next reference position.

A special mode of operation of switched reluctance machines is the continuous current mode, as disclosed in U.S. Pat. No. 5,469,039 (Ray), which is incorporated herein by reference. In this mode, the winding is re-connected to the supply before the flux, and hence the current, have returned to zero at the end of the energy return period. The phase windings therefore operate with current continuously flowing through them and are always linked by flux. This is an important mode for systems which have to produce high levels of overload output at some points of their operating cycle. Although the efficiency of the drive falls in this mode, it allows specifications to be achieved which would otherwise require a larger machine. However, in this mode there is no opportunity in the phase cycle to reset the integrators at some known point of zero flux and current, since such a point does not exist. It is therefore considered impossible to apply the method disclosed in EP-A-0573198.

Attempts to find a solution to this problem have included schemes which allow the drive to operate in continuous current mode except when the control system judges it essential to re-estimate the position, at which time the continuous current mode is exited, the position estimated, and the drive put back into continuous current. Specifically, this can be done by running the machine in a mode which is predominantly continuous current but drops back into discontinuous current at predetermined intervals to allow positional information to be gained. The technique depends on the speed being virtually constant, which may be approximately true at higher speeds (at which continuous current is usually employed). Nevertheless, a loss of torque is associated with dropping out of continuous current. An alternative method is to operate each phase in continuous current for a given number of cycles, say 10, and then excite the phase for a shorter time on the next cycle such that the current will definitely fall to zero, allowing the integrator to be reset and an accurate estimate of flux-linkage to be made. By interleaving this "short" cycle with the other phases operating in continuous current, the deleterious effect of the loss of torque is mitigated. However, none of these methods is satisfactory, since the loss of torque can render the machine performance unstable and several cycles are required before stability is reached again because the current must be built up over a period in the continuous current mode.

SUMMARY OF THE INVENTION

Embodiments of the invention provide robust rotor position detection by deriving a value for the flux linkage at a point in the inductance cycle which is relatively insensitive to angular error and then tracking a parameter indicative of flux linkage (such as phase voltage), applying a positive voltage, deriving a value for flux linkage at a subsequent point and using a corresponding value for phase current and the flux linkage to derive rotor position information.

According to one embodiment there is provided herein a method of detecting rotor position in a reluctance machine, comprising starting an integration of a parameter representing the phase voltage when the rotor is at a first predetermined point. At this point the integrator may be set to zero or set to a value representing the value of the flux linkage at the point. A value is derived for the flux linkage associated with the or at least one phase of the machine at the first point. A value of the phase flux linkage at a subsequent third point of the rotor is then derived and the derived flux linkage values are combined to give a value of flux linkage at the third point. The rotor position is then derived from the phase current and the value of the total flux linkage.

At the moment when positive voltage is applied to the phase, the current at the said moment may be substantially zero or non-zero. The value of the flux linkage at the moment when positive voltage is applied to the phase is derived from the current at the said moment, according to embodiments of the invention. For example, the flux linkage at the said moment is derived from the current and stored values of inductance for ordinates of current.

The method is useful in both discontinuous and continuous current modes of operation of a switched reluctance machine. The value of phase current at the first point can be used to derive the value of flux-linkage. When the current is discontinuous the zero current value gives rise to a zero value of flux-linkage. When the current is continuous the value of current can be used to derive the non-zero flux-linkage.

The flux-linkage at the said third point is derived by integrating the phase voltage from the first point, according to embodiments of the invention. The rotor position may be derived from stored parameters having coordinates of phase current and flux-linkage.

According to one particular embodiment, prior to turn-on a flux-measuring integrator is set to zero and is put into phase voltage integration mode. Then the current is measured at turn-on of a phase winding and this current value is used to index a table of inductance. The value of inductance provided by the table is then multiplied by the current to give an estimate of the flux-linkage in the phase and hence an offset value relating to the output of the integrator. At a predetermined subsequent point, the value of flux-linkage provided by the integrator is added to the calculated offset value and the resulting total is used to determine rotor position.

The flux-measuring integrator is initialized prior to turn on of a phase, according to embodiments of the invention, so that the calculation of flux linkage is initiated when the system is in a position where the inductance is not changing as rapidly with angle as elsewhere. A small error in position when initializing the integrator should therefore not lead to a significant error in the derived flux linkage. The technique is also robust in the presence of noise on the waveforms from which it deduces position.

Also according to the present invention there is provided a method in which rotor position is derived from values associated with each phase of a polyphase machine.

Embodiments of the present invention provide a robust and cost-effective method of monitoring rotor position without using a rotor position transducer while being able to operate in the single-pulse mode, with or without continuous current.

BRIEF DESCRIPTION OF THE DRAWINGS

Embodiments of the invention can be put into practice in a number of ways, some of which will now be described by way of example and with reference to the accompanying drawings in which:

FIG. 9 is a flow chart of the embodiment of FIG. 5.

DETAILED DESCRIPTION OF PREFERRED EMBODIMENTS

The phase inductance cycle of a switched reluctance machine is the period of the variation of inductance for the, or each, phase, for example between maxima when the stator poles and the relevant respective rotor poles are fully aligned. The illustrative embodiment to be described uses a 2-phase switched reluctance drive in the motoring mode, but any phase number from one upwards could be used, with the drive in either motoring or generating mode.

Figure 1:
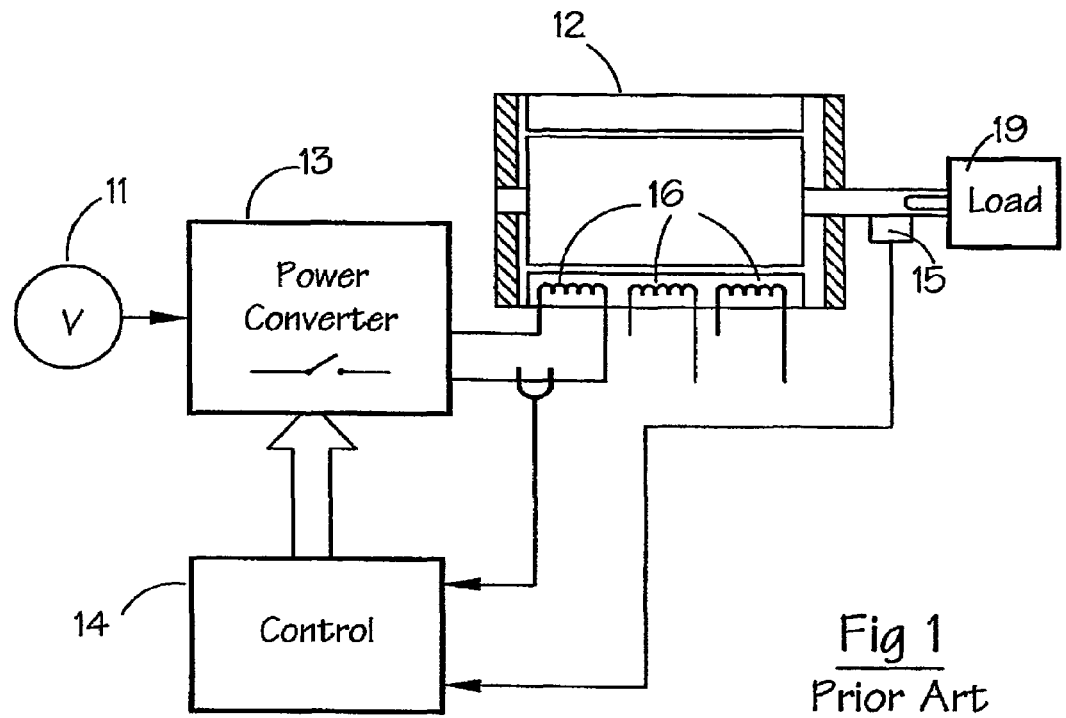
FIG. 1 shows a typical prior art switched reluctance drive.
Figure 2:
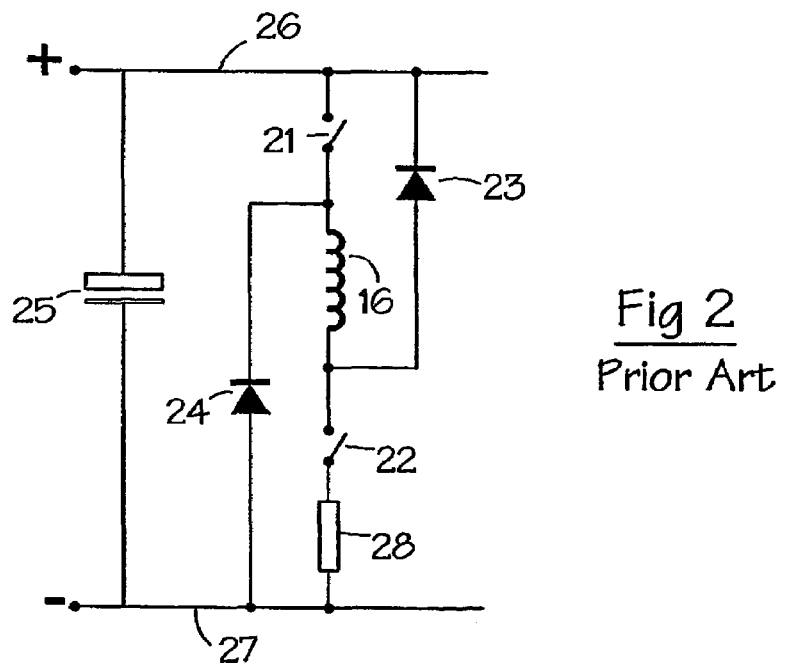
FIG. 2 shows a known topology of one phase of the converter of FIG. 1.
Figure 3:
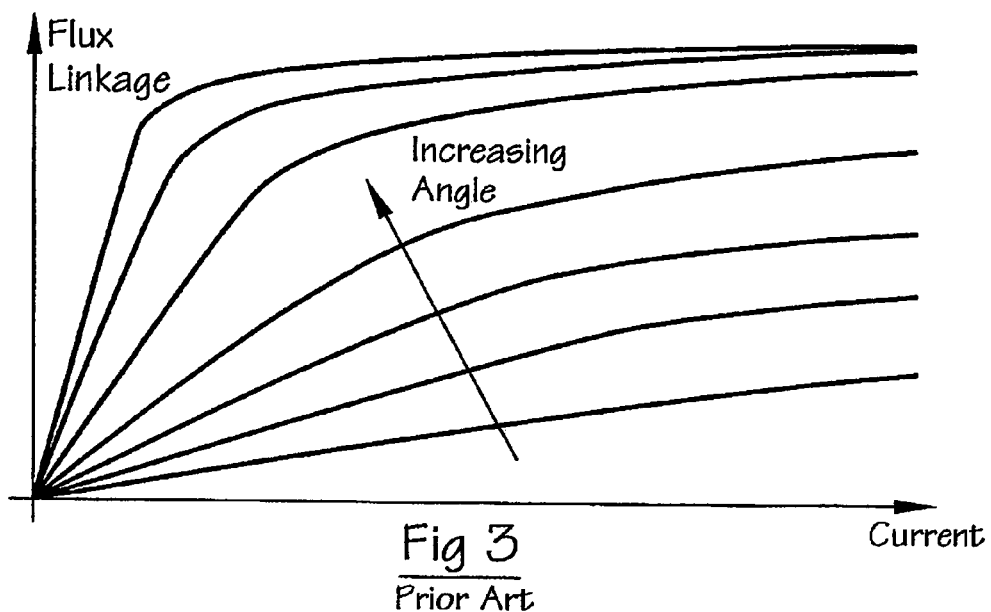
FIG. 3 shows typical flux-linkage and phase current curves, with rotor position as a parameter.
Figure 5:
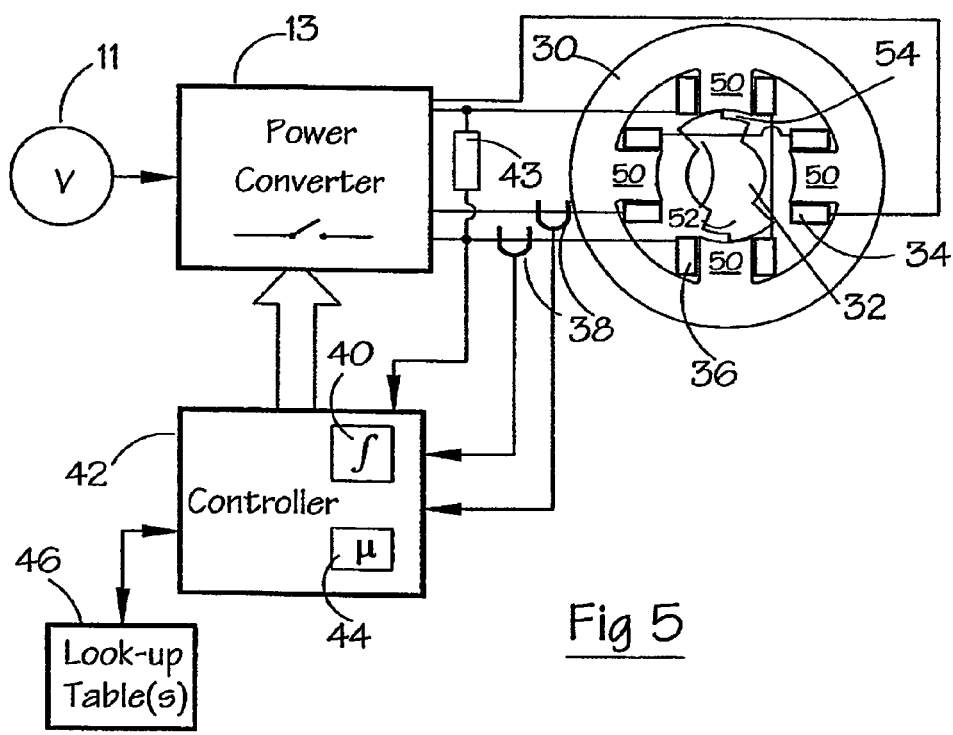
FIG. 5 shows in schematic form a switched reluctance drive according to an embodiment of the invention.
Figure 6:
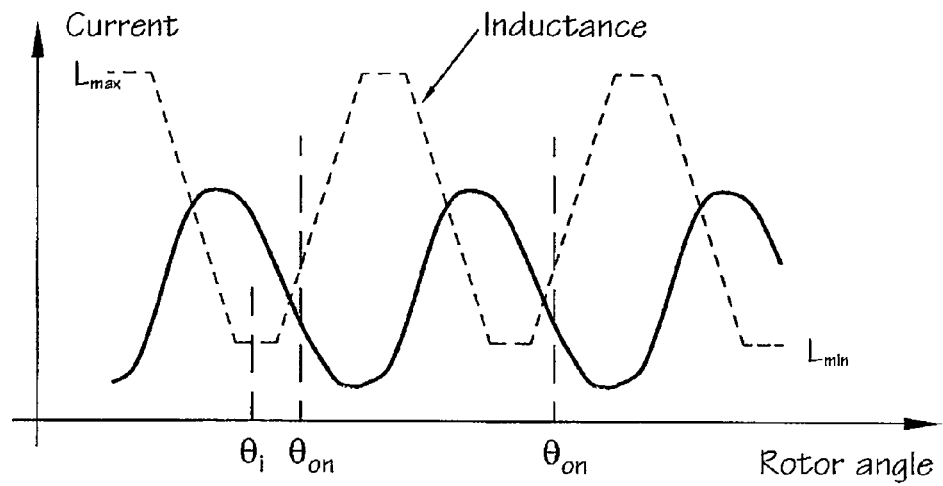
FIG. 6 shows a continuous current waveform for the drive of FIG. 5.

FIG. 5 shows a system for implementing a method according to an embodiment of the invention. FIG. 6 illustrates graphically a continuous current waveform for the system of FIG. 5. In this system, a power converter 13 is typically the same as that shown in FIG. 1, and like reference numerals have been used where appropriate. The converter 13 controls the switched reluctance machine, as before. The converter 13 is itself controlled by a controller 42 which, in this embodiment, is based on a digital signal processor, e.g. one from the Analog Devices 219x family. Alternative embodiments use a microprocessor or other form of programmable device that is well-known to one of skill in the art upon reading this patent application. The illustrated 2-phase machine has a stator 30 and a rotor 32. The stator has four poles 50, on which are wound phase windings 34/36. The rotor has rotor poles 52 and, to assist with starting the machine, has a pole face 54 that defines a stepped airgap with the face of a stator pole. One skilled in the art will realize upon reading this patent application that a machine with a different phase number or pole combinations could be used, since embodiments of the invention are not specific to any particular machine topology. Similarly, embodiments of the invention are not restricted to a particular type of control technique and any controller and converter can be used as long as it is suitably programmable.

Phase current is sensed by current transducers 38 each arranged in relation to one of the phase windings. The output signals indicative of current in each phase are fed to the controller 42. One or more look-up tables 46 storing phase inductance for rotor angles is also connected with the controller 42. While a current transducer for each phase is shown, one or a selection of phases could be monitored for phase current according to embodiments of the invention. Alternative embodiments use a current transducer in the DC link and a knowledge of the switch states in the power converter to deduce the individual phase currents.

An integrator 40 depicted in the controller 42 is used to derive measurements of flux by integrating the phase voltage V across the winding provided by a voltage transducer 43 associated with each phase. While the integrator is shown as a discrete device 40, according to embodiments of the invention it is implemented in the software running the processor 44. For greater accuracy the voltage drop (iR) across the winding can be factored out of the integrated value, as will be described below.

Other embodiments use a single voltage transducer sensing the DC link voltage to approximate to the phase voltage, as will be described below.

Figure 4A:
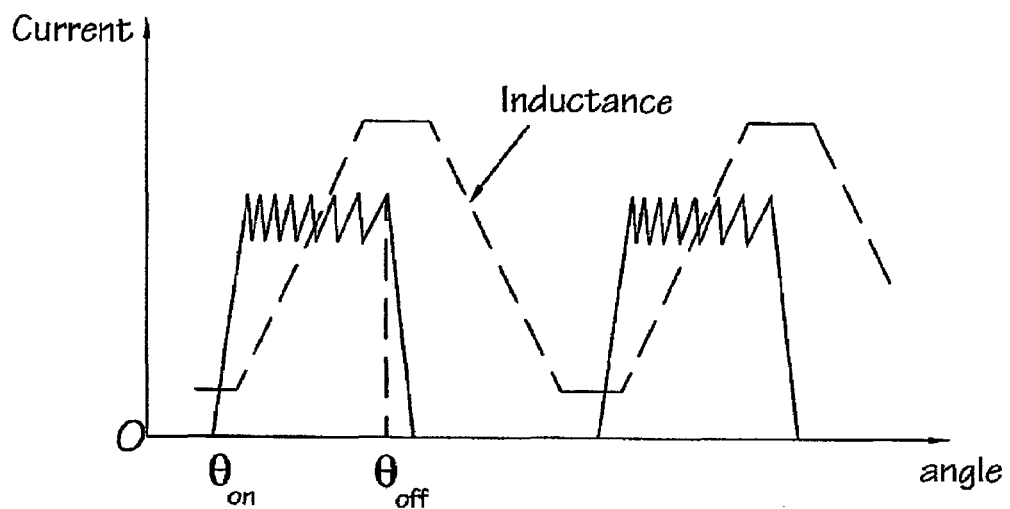
FIG. 4(a) shows a typical motoring current waveform in chopping control.
Figure 4B:
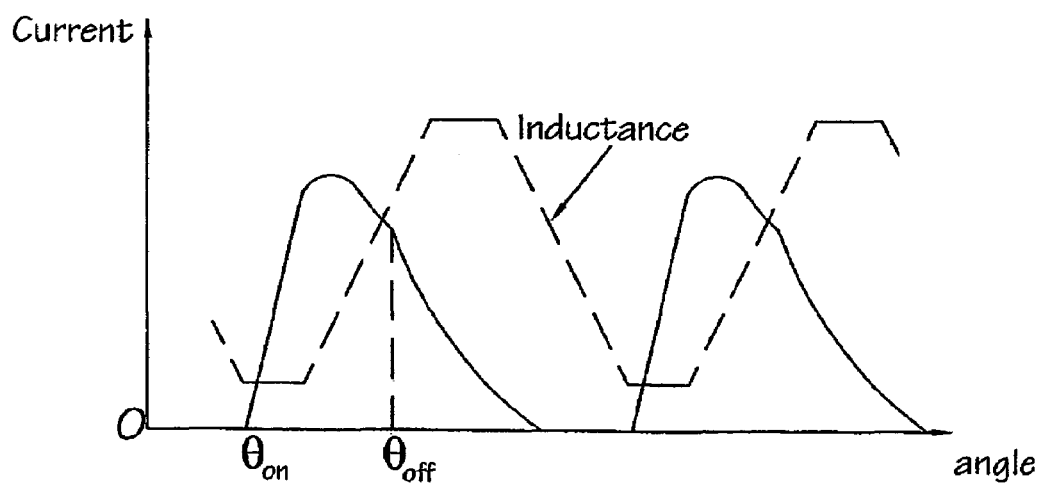
FIG. 4(b) shows a typical motoring current waveform in single-pulse control.
Figure 7:
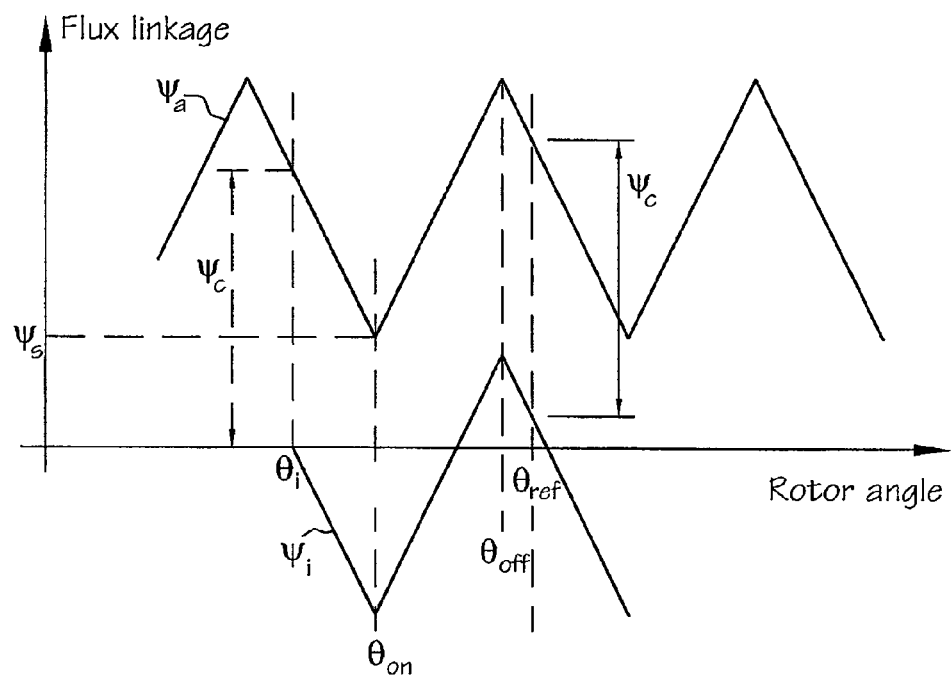
FIG. 7 shows flux-linkage waveforms in the drive of FIG. 5 in continuous current mode.

The method according to this embodiment operates as follows. It is assumed that the machine is operating in continuous current and that the rotor position is known sufficiently well to allow the winding to be energized. FIG. 6 shows the typical form of the current waveform and also has superimposed on it the idealized inductance profile of FIG. 4. FIG. 7 shows the flux associated with the phase winding, where $\psi_a$ shows the actual value and $\psi_i$ the value recorded by the integrator. The standing flux, $\psi_s$, which corresponds to the standing current in FIG. 6, is also marked on FIG. 7. For the sake of clarity, the flux waveforms are shown as being linear, whereas in practice they will likely have some non-linearity introduced by the iR drop in the winding and the impedance of the supply.

At or near minimum inductance ($L_{min}$) for instance at the point $\theta_i$, the current is measured and recorded and the flux-measuring integrator 40 is initiated and set to integrate. Since the inductance of the phase at that angle is already known and is stored in the look-up table(s) 46, a knowledge of current allows the actual flux-linkage at that angle to be estimated. This value, $\psi_c$, is stored as a correction factor. This value $\psi_c$ represents an offset factor between the true flux linkage value and the flux linkage value output by the integrator. Note that this calculation can be done immediately or as a background task in the processor. The flux-measuring integrator 40 is started prior to turn on of a phase, so that the calculation of flux linkage can be advantageously initiated when the rotor is at a position where the inductance is not changing rapidly. A small error in position when calculating flux linkage (i.e. $\theta_i$ +/- a small percentage) will therefore not lead to a significant error in the estimated flux linkage.

As the rotor moves from the $L_{min}$ point, the flux is falling (since the switches supplying the phase are open and the action of the diodes is such as to apply reverse voltage across the phase) so the integrator output goes negative. The rotor continues to move until the switch-on point $\theta_{on}$ is reached, where the flux-linkage changes direction because positive voltage is now applied.

As the rotor moves towards the switch-off point $\theta_{off}$, the integrator continues to integrate, now with positive-going slope, corresponding to the positive flux across the phase winding. At $\theta_{off}$, the applied voltage goes negative and the flux-linkage, both actual and estimated, begins to fall. This continues until a predetermined reference position $\theta_{ref}$ has been estimated to have been reached, at which point the current and integrator output are recorded. The actual flux can now be estimated by adding $\psi_c$ as an offset to the integrator output. This value, and that of the measured current, can be compared with the stored values for the reference position and the true position then assessed, as will be explained in more detail below.

It will be appreciated that there are different methods of implementing the above process, to equal effect. For example, the flux-linkage at $\theta_i$ could be calculated immediately the value of current is available and that value pre-loaded into the integrator. In this case, the output of the integrator will follow the actual curve $\psi_a$ and there will be no need to add an offset value at the reference point $\theta_{ref}$. This embodiment only requires the integrator to operate in one quadrant, as opposed to the two-quadrant operation described above. While the integration of the phase voltage (or a signal representative of the phase voltage) is used to derive flux linkage values, it is possible to use other techniques, including direct flux linkage sensing that tracks the flux in an inductance period. Examples of devices that can be used to track the flux linkage directly are flux nulling sensors and Hall-effect sensors. Other variants will be apparent to those skilled in the art upon reading this patent application.

The angular difference $\Delta\theta$ between the predicted rotor position $\theta_m$ and the reference rotor position $\theta_{ref}$ can be calculated by the processor 44 as $$\Delta\theta = \left\{\frac{\partial \theta}{\partial \psi_m}\right\} \cdot \Delta\psi \quad (1)$$

In order to determine the angular difference between the predicted position (at which the measurement of flux and current are made) and the reference position, it is therefore also a feature of this embodiment to store in the processor for the reference position values of partial derivative $\partial\theta/\partial\psi$ (or its inverse $\partial\psi/\partial\theta$) for a set of values of phase current i.

Since the reference rotor position $\theta_{ref}$ is known, the true rotor position at the predicted instant in time may be calculated from $\Delta\theta$ as $$\theta_m = \theta_{ref} + \Delta\theta \quad (2)$$

The expected time to the next rotor position can then be estimated using the known value of motor speed. Under accelerating or decelerating conditions a correction may need to be made to the estimate.

If only one phase is used for measurement, the next rotor reference position will be after a rotation of $(360/np)° - \Delta\theta$ and, by dividing this angle by the speed, the time required to reach this position can be estimated.

If all phases are used for measurement, the next rotor reference position will be that for phase 2 (or whatever is the next phase in the sequence). For an n-phase motor with p rotor poles, the angle of rotation to this position will be $(360/np)° - \Delta\theta$ and, by dividing this angle by the speed, the time required to reach this next position can be estimated.

The predicted time to the next reference position is then counted out using a high frequency clock (not shown) by known means and at the instant such time has elapsed a further measurement of flux $\psi_m$ and current $i_m$ is made for the corresponding phase. Due to changes in speed, and tolerances in stored data and calculations, the predicted position $\theta_m$ will not be identical to the reference position $\theta_{ref}$. The angular difference $\theta_{ref} - \theta_m$ can again be calculated using equations (1) and (2) and the procedure outlined above. A flowchart describing this embodiment of the invention, as implemented by the controller 44, is shown in FIG. 9. At step 91 the estimate of rotor position is monitored and at step 92 a test is performed to determine if the rotor has reached $L_{min}$, for example by monitoring an incremental counter representing angular position. If it has not reached $L_{min}$, control returns to step 90. When $L_{min}$ is reached, control passes to step 93 where the integrator 40 is started, the phase current at the start of integration of the signal representing phase voltage is recorded, and the value of the flux-linkage offset $\psi_c$ is calculated from the current and the value of inductance from the look-up table and stored. At step 94, the rotor position is monitored until the rotor reaches the estimate of reference angle. When this angle is assessed to have been reached, step 95 records the output of the integrator 40 and the current from the transducer 38 for the phase. The total flux-linkage is calculated at step 96 using the integrator output and the stored value of offset, as described above. At step 97, the position is now estimated by use of the measured current and the newly calculated value of total flux linkage. This position is now used as the best current estimate and control now returns to the start of the routine ready for another phase inductance cycle.

It will be appreciated by those skilled in the art that the process described above can be implemented by monitoring the quantities associated with one phase only and switching angles for this and other phases can then be interpolated. Alternatively, a similar process can be run in parallel for each phase, or the quantities from several phases can be interleaved in a single process to increase the rate at which information is made available.

The process of predicting rotor positions on a phase by phase basis and measuring the true rotor position at each measurement instant is repeated to provide an increment indication of rotor position as a direct replacement for existing optical or electromagnetic rotor position sensors. The procedure for the case of single-pulse operation under regenerating conditions is the same as described above except that the values of $\partial\theta/\partial\psi$ will be negative (rather than positive) for the corresponding typical reference rotor position.

Various arrangements may be used for obtaining the value of flux. It can be measured by any known form of flux transducer, e.g. a Hall-effect device. However, it is often considered preferable to estimate the value by means of analog or digital electronic resettable integrators (which integrate the phase voltage with respect to time t), together with means for compensating for the resistive voltage drop in the phase winding.

The integrator executes the equation:

$$\psi = \int_{t_o}^{t_m} (v - iR)dt \quad (3)$$

where:
v is the phase voltage
i is the phase current
R is the phase resistance
$t_m$ is the instant of measurement The integrator start time $t_o$ is arranged to be a point $\theta_i$ at or about $L_{min}$, or some other suitable point, as discussed below. The digital processor is informed of this point by the electronic controller using a control interface (not shown). The integrator is reset by the digital processor immediately before integration begins.

In applications for which the direct source voltage V is relatively large compared with the voltage drop across the semiconductor switches in the power converter, the direct source voltage may be measured and integrated in place of the individual phase voltages. This has the advantage that only one voltage need be measured and is an advantageous method for high-voltage systems where the cost of isolation of the voltage transducer is significant.

The flux is then measured as:

$$\psi = \int_{t_o}^{t_m} (V - iR) dt \quad (4)$$

As an alternative to using separate electronic integrators, the digital processor may be used by multiplying the direct supply (or phase) voltage by time on a step by step basis. While this has the disadvantage that the digital processor is substantially busy and may need to be a separate unit, it removes the need for one or more hardware integrators.

However, provided the supply voltage is substantially constant and large compared with the resistive voltage iR, various approximations may be made. For example:

$$\psi_m = (V - k i_m R)(t_m - t_o) \quad (5)$$

where k is a constant, typically k=0.5, such that:

$$k i_m (t_m - t_o) \approx \int_t^{t_m} i \, dt$$

As a further embodiment, in the case where the supply voltage V is relatively large compared with the resistive voltage iR, the need to compensate for the resistive voltage drop may be avoided by using a modified value for the flux in the stored data or ignoring iR altogether.

In this case, the values of phase flux linkage $\psi$ for a particular current i and particular rotor position θ stored in the digital processor are replaced by values of the volt-second integral $\psi'$ required to create the phase current i for the rotor position θ given by $$\psi' = \int v \, dt$$

In testing the machine to establish the table of values of $\psi'$ and $\partial\theta/\partial\psi'$, v may, for convenience, be held constant (provided v is relatively large) and is preferably equal to supply voltage. The rotor position measurement procedure is the same as already described in this application except that the measured flux $\psi_m$ and expected flux $\psi_e$ and partial derivative $(\partial\theta/\partial\psi)$ are replaced by $\psi'_m$, $\psi'_e$ and $(\partial\theta/\partial\psi')$ respectively, where $\psi'_e$ and $(\partial\theta/\partial\psi')$ are obtained as described from the stored data represented in FIG. 5 and where the flux $\psi_m'$ is measured as $$\psi_m' = V(t_m - t_o) \quad (6)$$

Equations (3), (4), (5) and (6) represent different methods of evaluating the phase flux linkage for the purpose of identifying rotor position and these represent different implementations of the technique.

The various embodiments described above are all based on the measurement of flux $\psi_m$ and current $i_m$ at a predicted rotor position, the look-up of the expected flux $\psi_e$ for the measured current $i_m$ corresponding to the reference rotor position, and the calculation of the difference Δθ between the reference rotor position and the predicted rotor position according to the equation:

$$\Delta\theta = \left\{ \frac{\partial\theta}{\partial\psi_m} \right\} \cdot (\psi_m - \psi_e) \quad (7)$$

Figure 8:
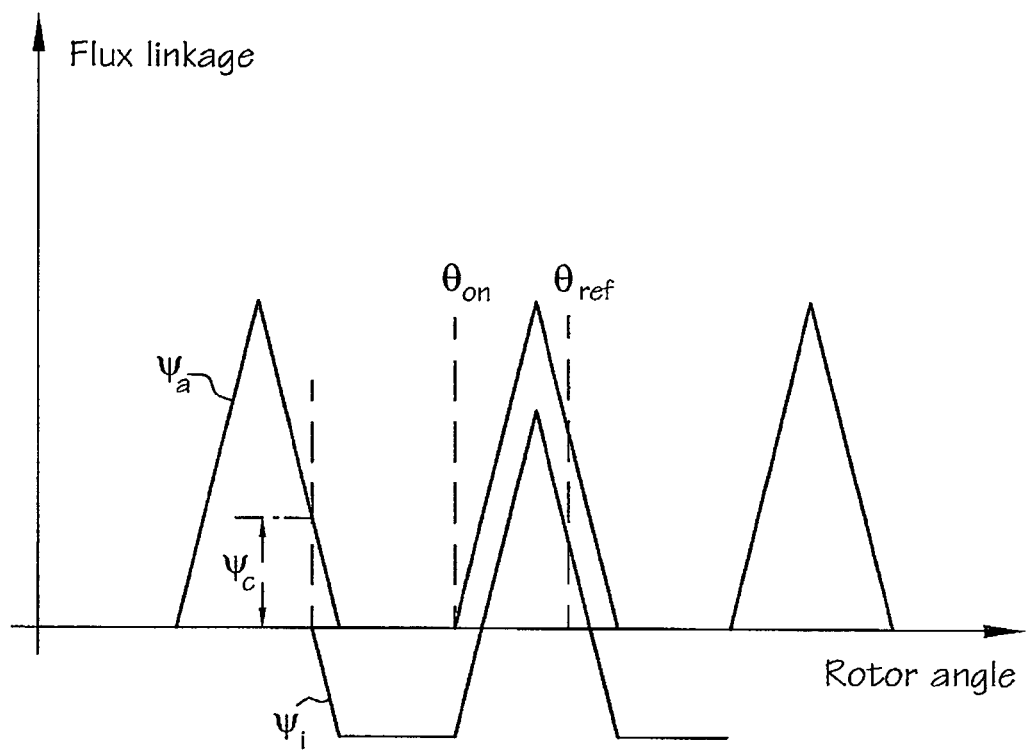
FIG. 8 shows flux-linkage waveforms in the drive of FIG. 5 in discontinuous current mode.

This embodiment of the invention is particularly advantageous in that it works equally well when the phase current is discontinuous, i.e. in the conventional single-pulse mode. This is illustrated graphically in FIG. 8. The integrator simply follows the shape of the discontinuous flux waveform, enabling the same program code can be used in the controller 42 for both discontinuous and continuous current. The method described above provides a simple, yet effective, way of combining continuous current operation with sensorless position detection, without any unwanted degradation in the performance of the machine.

The choice of reference position is left to the designer of any particular system, but for 3-phase systems is conveniently taken as one sixth of an electrical cycle away from $L_{max}$, on the falling inductance curve for motoring and on the rising inductance for generating. These positions coincide with $L_{min}$ for the previous phase.

Since in a microprocessor-based implementation the time is known very accurately, it may be convenient to average the applied voltage and use this value in the equations given above. This may produce useful savings in the control system by allowing a constant to be used rather than a quantity varying within an integration cycle. Hence the integration process can be reduced to a simple multiplication of the constant by the elapsed time. In this embodiment, cognizance must be taken of the switch states to determine whether the flux-linkage is increasing or decreasing and the appropriate sign can then be assigned to the integrand.

The descriptions above have taken the initial measurement point to be at a position near the minimum inductance value of the phase winding, since many machines have a relatively wide region of slowly varying inductance there. However, if the geometry of the machine is such as to produce an inductance profile with a narrow $L_{min}$, it may be more convenient to begin the integration from $L_{max}$. In both cases, advantage is taken of relative insensitivity of the inductance with rotor position, enabling a more accurate assessment of flux-linkage.

A further embodiment of the invention can be used to correct the value of resistance of a phase winding used in the integration described by Equation 3. If the integrator is allowed to continue to integrate past the reference point $\theta_{ref}$ to the next rotor position $\theta_i$, then two values for the flux linkage are now available: one given by the measured current and the look-up table 46; and one given by the output of the integrator 40 (corrected where required for any offset). If these values do not coincide within a predetermined tolerance, the error may be ascribed to a variation in the actual value of R, the phase winding resistance. A suitable correction can then be made by any of the many correcting algorithms known in the art and the corrected value of R used in subsequent integrations.

Thus a switched reluctance drive is controlled without using a physical transducer for detecting rotor position. The method works robustly regardless of whether the current is continuous or discontinuous.

The skilled person will appreciate that variations of the disclosed arrangements are possible without departing from the invention, particularly in the details of the implementation of the algorithm in the controller. Also, the diagnosis on which rotor position detection is based could be carried out in only one phase of a polyphase machine. Accordingly, the above description of several embodiments is made by way of example and not for the purposes of limitation. It will be clear to the skilled person that minor modifications can be made to the drive circuit without significant changes to the operation described above. For instance, the method may be applied to linear as well as rotating machines.

What is claimed is:

1. A method of detecting rotor position in a reluctance machine, the machine having at least one phase winding with an inductance which is periodic with rotor position, comprising:
    deriving a value for flux linkage associated with the at least one phase winding of the machine at a first point;
    tracking a value of a parameter indicative of the flux linkage;
    advancing the rotor to a second point where positive voltage is applied to the phase winding;
    deriving a value of phase current and the parameter at a subsequent third point of the rotor;
    evaluating the flux linkage at the third point; and
    deriving the rotor position from the phase current and the value of the flux linkage.

2. A method as claimed in claim 1 in which the tracking includes an integration process which is started at the first point to integrate a voltage representing phase voltage and in which the value of the flux linkage is at least in part based on the value of the parameter at the third point.

3. A method as claimed in claim 2 in which the integration process is set to zero at the first point and the value of the flux linkage at the third point is based on a combination of a value of flux linkage derived from the parameter at the third point and the derived value of the flux linkage at the first point.

4. A method as claimed in claim 2 in which the value of the parameter is set to a value representing the derived value of the flux linkage at the first point and the value of the flux linkage at the third point is derived from the value of the parameter at the third point.

5. A method as claimed in claim 2 in which the integration process is arranged to integrate supply voltage as the phase voltage.

6. A method according to claim 1, wherein the first predetermined point coincides with the inductance of the phase winding being at or near a minimum or a maximum.

7. A method as claimed in claim 1 in which the rotor position is derived from stored parameters having coordinates of phase current and flux linkage.

8. A method as claimed in claim 1 in which rotor position is derived from values associated with each phase of a polyphase machine.

9. A method as claimed in claim 1 in which rotor position is derived from values associated with one phase of a polyphase machine.

10. A method as claimed in claim 1 further comprising comparing the value of the parameter when the rotor next reaches the first point with the value of the parameter when the rotor was previously at the first point and forming an error factor in dependence on the comparison.

11. A method as claimed in claim 10 wherein the error factor is used to adjust a value for resistance of the phase winding used to determine flux linkage.

12. A rotor position detector for a reluctance machine having at least one phase winding, comprising a device programmed to:
    derive a value for flux linkage associated with the or at least one phase of the machine at a first point;
    track a value of a parameter indicative of the flux linkage;
    advance the rotor to a second point where positive voltage is applied to the phase;
    derive a value of phase current and the parameter at a subsequent third point of the rotor;
    evaluate flux linkage at the third point; and
    derive the rotor position from the phase current and the value of the flux linkage at the third point.

13. A detector as claimed in claim 12 in which the device is programmed to track by starting an integration of a voltage representing phase voltage at the first point, the value of the flux linkage being at least in part based on the value of the parameter at the third point.

14. A detector as claimed in claim 13 in which the integrator is set to zero at the first point, and the device is programmed to base the value for the flux linkage on a combination of the value of flux linkage derived from the parameter at the third point and the derived value of the flux linkage at the first point.

15. A detector as claimed in claim 13 in which the value of the parameter is set to a value representing the derived value of the flux linkage at the first point and the value of the flux linkage is derived from the value of the integration at the third point.

16. A detector as claimed in claim 13 in which the device is programmed to establish the first predetermined point to coincide with minimum or maximum inductance of the phase winding in the inductance cycle.

17. A detector as claimed in claim 13 including a store of parameters having coordinates of phase current and flux linkage, the device being programmed to derive rotor position from the stored parameters.

18. A detector as claimed in claim 17 in which the stored parameters are associated with one or more phases of a polyphase machine.

19. A detector as claimed in claim 13 in which the device is programmed to compare the output of an integrator performing the integration when the rotor next reaches the first point with the output of the integrator when the rotor was previously at the first point and is further programmed to form an error factor in dependence on the comparison.

20. A detector as claimed in claim 19 in which the device is programmed to adjust a value for resistance of the phase winding used to determine flux linkage.

21. A detector as claimed in claim 13 in which an integrator performing the integration is arranged to integrate the supply voltage as the phase voltage.

22. A rotor position detector for a reluctance machine having at least one phase winding, comprising:
    means for deriving a value for flux linkage associated with the or at least one phase of the machine at a first point;
    means for tracking a value of a parameter indicative of the flux linkage;
    means for advancing the rotor to a second point where positive voltage is applied to the phase;
    means for deriving a value of phase current and the parameter at a subsequent third point of the rotor;
    means for evaluating flux linkage at the third point; and
    means for deriving the rotor position from the phase current and the value of the flux linkage at the third point.

* * * * *